(12) United States Patent
Shimada

(10) Patent No.: US 6,317,398 B1
(45) Date of Patent: Nov. 13, 2001

(54) DATA REPRODUCTION APPARATUS AND DATA REPRODUCTION CONTROL CIRCUIT

(75) Inventor: Hiroshi Shimada, Kamakura (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/323,834

(22) Filed: Jun. 2, 1999

(30) Foreign Application Priority Data

Jun. 2, 1998 (JP) ................................................ 10-167787

(51) Int. Cl.[7] ....................................................... G11B 5/09
(52) U.S. Cl. ................................. 369/47.32; 369/47.38; 369/47.48; 369/53.3
(58) Field of Search .............................. 369/47.15, 47.28, 369/47.19, 47.29, 47.3, 47.32, 47.33, 47.35, 47.38, 47.42, 47.44, 47.48, 47.43, 53.3, 53.43

(56) References Cited

U.S. PATENT DOCUMENTS 5,526,339  6/1996  Shimada .
5,802,026  9/1998  Tsukihashi .

FOREIGN PATENT DOCUMENTS 6-176479  6/1994  (JP) .

Primary Examiner—Paul W. Huber
(74) Attorney, Agent, or Firm—Oblon, Spivak, McClelland, Maier & Neustadt, P.C.

(57) ABSTRACT

A data reproduction apparatus includes a system controller for monitoring an amount of data in a memory and a linear velocity detected by a linear velocity detecting section, controlling a DC signal output from a DC signal generating section to a disk motor driving section as a drive signal, and controlling interruption and resumption of writing of information to the memory so as to prevent the memory from overflowing. The output DC signal of the DC signal generating section is controlled such that a velocity at which information is written to the memory means is higher than a velocity at which information is read therefrom so as to always store information in the memory, and the linear velocity detected by the linear velocity detecting section becomes close to a preset linear velocity, and the rotation of the disk is controlled by the DC signal. The power consumption required for controlling the rotation of the disk can thus be reduced.

20 Claims, 14 Drawing Sheets

DATA REPRODUCTION APPARATUS AND DATA REPRODUCTION CONTROL CIRCUIT

BACKGROUND OF THE INVENTION

The present invention relates to an apparatus for reproducing data from a disk such as a CD (compact disk), an MD (mini disk) and a DVD (digital versatile disk), and a reproduction control circuit.

At present, a digital recording/reproduction system in which an audio signal is converted to a digital signal by the PCM (pulse code modulation) technique and the digital signal is recorded on a recording medium such as a disk and a magnetic tape and reproduced therefrom, is known as one for achieving high-density and high-fidelity recording/reproduction in the field of acoustic equipment. In particular, a CD in which a pit string corresponding to digital data is formed on a 12-cm-diameter disk and read out optically, is the most popular. The CD is rotated by causing an optical pickup including a semiconductor laser and a photoelectric transducer to linearly track the disk from its inner radius to its outer radius and by rotating the disk at CLV (constant linear velocity) to read data out of the disk. In addition to the CD, a CD-ROM and a DVD are known as a data reproduction apparatus.

The data reproduction apparatus such as a CD and an MD has a function of setting a data readout velocity higher than a given reproduction velocity, storing readout data in a semiconductor memory, and reading the data out of the memory at the reproduction velocity, for the following two reasons.

(1) In a portable CD player and a portable MD player, the resistance to vibrate at the time of data reproduction is increased as follows (audio data can be reproduced continuously even though any vibration is applied to the player from outside). Data is stored in advance in a semiconductor memory. If readout of data from a disk is interrupted due to vibration, the interruption is compensated for the data stored in the memory, and the readout is restarted before all the data is read out of the memory. The data can thus be reproduced without interruption.

(2) In a peripheral storage apparatus of information equipment (host) such as a CD-ROM drive, data can be transferred to the host through an I/F (interface) at high velocity by request therefrom since a signal read out of a disk is stored in a semiconductor memory.

Even in the above CD-ROM drive, an audio signal needs to be reproduced from a CD-DA (CD-digital audio) disk, whereas digital data is read from a CD-ROM disk at velocity which is much higher than a given reproduction velocity of the CD-DA disk. When CD-ROM data and CD-DA data are recorded on a single disk and both are frequently reproduced therefrom, the former data is reproduced at high velocity and the latter data is done at given velocity. Therefore, the abrupt acceleration and deceleration of rotation of the disk have to be repeated, which increases the power consumption of a rotation control system. Moreover, it becomes more difficult to design a control circuit for controlling both CD-ROM and CD-DA sections by one motor and one pickup element.

For the purpose of reducing power consumption and simplifying the configuration of the control circuit, the above problems can be resolved as follows. Even when CD-DA data is reproduced, data is read out of a high-velocity disk and temporarily stored in a semiconductor memory. The data is thus read from the memory at the given velocity.

The system configuration of a reproduction apparatus having the above function (1), such as a portable CD player and a portable MD player, is illustrated in FIG. 13.

In the apparatus in FIG. 13, a disk 1 is rotated by a disk rotation control circuit 2, a disk motor driving circuit 3 and a disk motor 4 at CLV which is higher than predetermined velocity. A pickup element 5 linearly tracks the rotating disk 1 from its inner radius to its outer radius to read data out of the disk 1. The data read by the pickup element 5 is amplified by a head amplifier 6 and converted to a wide-band signal (RF signal). The RF signal is then converted to binary data of only two high and low levels by a binarization circuit 7. The binary data is supplied to a PLL (phase locked loop) circuit 8 and a signal processing circuit 9. In the circuit 9, first, a synchronization signal separation circuit 10 separates a synchronization signal from the RF signal, and then sends the synchronization signal to the disk rotation control circuit 2 and sends reproduction data excluding the synchronization signal to a demodulation circuit 11. The reproduction data is demodulated by the circuit 11 and error-corrected by an error-correction circuit 12. The error-corrected data is written to a memory 14 directly or through a compression circuit 13 in response to a clock signal generated by the PLL circuit 8, which is synchronized with an RF signal. The MD does not necessitate the compression circuit 13 because compressed data is already recorded thereon. In the CD, data compressed by the compression circuit 13 is written to the memory 14 to reduce the capacity of the memory 14.

Even in the CD's case, data may be written to the memory 14 directly without being compressed. The data is read out of the memory 14 at predetermined reproduction velocity in response to a readout clock signal generated from a crystal oscillator 15 and then supplied to an output processing circuit 17 as it is or through an extension circuit 16. The MD requires the extension circuit 16 because compressed data is already recorded thereon. The CD needs the circuit 16 only when data is compressed to reduce the capacity of the memory 14, and not when data is written to the memory 14 directly without being compressed. The data supplied to the output processing circuit 17 is output as digital data, converted to an analog signal using a D/A converter 18, or converted to a digital output signal using a digital audio I/F 19.

The sub-code information separated in the demodulation circuit 11 is transmitted to a sub-code processing circuit 20 and its address information is demodulated. The rotation control circuit 2 generates a control signal having a CLV from the synchronization signal and sends it to the disk motor driving circuit 3 to control the disk motor 4 at CLV.

A system controller (microprocessor) 21 monitors an amount of data in the memory 14 and address information from the sub-code processing circuit 20 and controls writing of data to the memory 14 to prevent the memory 14 from overflowing. The pickup element 5 is thus controlled. If a readout operation of the disk 1 is interrupted due to vibrations from outside, the system controller 21 causes the readout operation to be restarted.

If, in the above reproduction apparatus, data is read out of the disk at velocity which is higher than predetermined reproduction velocity, i.e., at velocity twice as high as the reproduction velocity, the velocity at which data is written to the memory becomes twice as high as the velocity at which data is read therefrom and thus data can always be stored in the memory. When the pickup element is affected by vibrations from outside to interrupt a read operation of the disk, if data is read out of the memory, the output of reproduction signals is not interrupted but the pickup element is controlled and the read and write operations can be restarted. The reproduction signals can thus be output without interruption to improve the resistance of the apparatus to vibrate.

The system configuration of a reproduction apparatus having the above function (2), such as a CD-ROM drive, is illustrated in FIG. 14.

In the reproduction apparatus in FIG. 14, a disk 1 is rotated by a rotation control circuit 2, a disk motor driving circuit 3 and a disk motor 4 at CLV or CAV (constant angular velocity) which is higher than predetermined velocity. The disk motor driving circuit 3 or disk motor 4 sends an FG signal indicative of angular velocity information to the rotation control circuit 2.

A pickup element 5 linearly tracks the rotating disk 1 from its inner radius to its outer radius to read data out of the disk 1. The data read by the pickup element 5 is amplified by a head amplifier 6 and converted to a wide-band signal (RF signal). The RF signal is then converted to binary data of only two high and low levels by a binarization circuit 7. The binary data is supplied to a PLL circuit 8 and a signal processing circuit 9. In the circuit 9, first, a synchronization signal separation circuit 10 separates a synchronization signal from the RF signal, and then sends the synchronization signal to the rotation control circuit 2 and sends reproduction data excluding the synchronization signal to a demodulation circuit 11. The reproduction data is demodulated by the circuit 11 and error-corrected by an error-correction circuit 12. The error-corrected data is written to a memory 14 directly or through a CD-ROM decoding circuit 22 in response to a clock signal generated by the PLL circuit 8, which is synchronized with an RF signal. A CD-ROM disk necessitates the CD-ROM decoding circuit 22, and not a CD-DA disk. The data is read out of the memory 14 at given reproduction velocity in response to a clock signal generated by a crystal oscillator 15 and then supplied to an output processing circuit 17.

In the CD-ROM disk, a signal is output through an I/F circuit 23. In the CD-DA disk, a signal is converted to an analog signal by a D/A converter 18 and then output from the circuit 17 or it is converted to a digital signal by a digital audio I/F 19 and then output therefrom.

In the signal processing circuit 9, the sub-code information is transmitted to a sub-code processing circuit 20 and its address information is demodulated. The rotation control circuit 2 generates a control signal having a CLV from the synchronization signal or generates a control signal having a CAV from the FG signal (angular velocity information) and sends it to the disk motor driving circuit 3 to control the disk motor 4 at CLV or CAV. A system controller (microprocessor) 21 monitors an amount of data in the memory 14 and address information from the sub-code processing circuit 20 and controls writing of data to the memory 14 to prevent the memory 14 from overflowing. The pickup element 5 is thus controlled.

Assume, in the above-described apparatus, that CD-ROM data and CD-DA data are recorded on a single disk and both are reproduced frequently therefrom. The CD-DA data as well as the CD-ROM data is read from the disk at high velocity and stored in a semiconductor memory, and then the data is read from the memory at given velocity. Since, therefore, both the CD-ROM data and CD-DA data can be reproduced without abruptly accelerating and decelerating the rotation of the disk, its power consumption is prevented from increasing. Since the rotation speeds for reading the CD-ROM data and CD-DA data are close to each other, a control circuit can easily be designed by the same motor and the same pickup element.

According to the foregoing apparatuses, the readout velocity of the disk is always set higher than predetermined reproduction velocity and thus the power consumption of a rotation control system becomes higher than that in the readout operation performed at the predetermined velocity. Since, in the CLV control, the angular velocity of the inner radius of a disk and that of the outer radius thereof differ from each other, the motor is accelerated and decelerated whenever the pickup element is moved in and out along the radius of the disk by access and controlled at CLV, with the result that the power consumption of a motor system is increased. Since portable CD and MD players are operated by batteries, high power consumption unfavorably shortens the lifetime of the batteries.

Since, furthermore, the CLV or CAV is controlled by increasing the speed of the rotation control system, a motor having high torque has to be used as the disk motor and accordingly the motor system is likely to increase in costs.

Since, in the CLV control, a synchronization signal is detected to control the motor at CLV when a read operation is resumed after its interruption, a time is required until the rotation control system is stabilized and accordingly a preparation to resume the read operation has to be made at an earlier time and power consumption therefor is increased. In the CAV control, the rotation can always be stabilized by the FG signal; however, an FG signal generation means for generating angular velocity information is needed to control a disk on which data is recorded at CLV, such as a CD, and thus the motor system is likely to increase in costs.

BRIEF SUMMARY OF THE INVENTION

The present invention has been developed in consideration of the above situation and its object is to provide a data reproduction apparatus and a data reproduction control circuit which have a function of rotating a disk at a velocity which is higher than a required reproduction velocity to store information recorded on the disk in a semiconductor memory and then read the information out of the memory at predetermined reproduction velocity and which reduce in power consumption by controlling the rotation of the disk without feedback control.

The feature of the above apparatus resides in that the rotation of a disk is controlled in response to a given DC signal without using any feedback control such as CLV control and CAV control. The feature makes it possible to reduce the power consumption for controlling the disk rotation.

According to a first aspect of the present invention, there is provided a data reproduction apparatus comprising a pickup element for reading out a signal including information from a disk on which the information is recorded; a head amplifier for amplifying necessary information output from the pickup element; a binarization circuit for converting a signal including the information amplified by the head amplifier into binary data; a PLL circuit for generating a clock signal synchronized with an output signal of the binarization circuit; a signal processing circuit for processing the output signal of the binarization circuit based on the clock signal generated by the PLL circuit to output information; a reproduction clock signal generation circuit for generating a reproduction clock signal necessary for reproducing the information from the disk; a memory to which the information output from the signal processing circuit is written in response to the clock signal generated by the PLL circuit and from which information is read in response to the reproduction clock signal generated by the reproduction clock signal generation circuit, for storing the information read out from the disk; a disk motor for rotating the disk; a disk motor driving circuit for driving the disk motor; and a DC signal generation circuit for generating a DC signal and sending the DC signal to the disk motor driving circuit as a drive signal. In the data reproduction apparatus according to the first aspect of the present invention, the disk motor can be rotated by a DC signal. Accordingly, acceleration and deceleration in the speed control of the disk motor are not executed to decrease the power consumption of the disk motor caused by the acceleration and deceleration of the disk motor. In particular, when the pickup element is moved suddenly in and out along a radius of the disk for access, unlike in the prior art case, the disk motor is not controlled at CLV by its acceleration and deceleration and thus power consumption of the motor system can be decreased. Furthermore, the above power consumption can be decreased even by the use of an inexpensive DC motor with a brush.

In the data reproduction apparatus according to the first aspect of the present invention, the apparatus may further comprise a linear velocity detection circuit for detecting a reproduction linear velocity of the disk from a synchronization signal recorded on the disk and separated by the signal processing circuit. The data reproduction apparatus may further comprise a system control circuit for monitoring the reproduction linear velocity detected by the linear velocity detection circuit, and controlling the DC signal output from the DC signal generation circuit on the basis of the result of the monitoring.

In the data reproduction apparatus according to the first aspect of the present invention, the apparatus may further comprise a pickup control circuit for controlling the pickup element. The data reproduction apparatus may further comprise a system control circuit which interrupts the writing of information to the memory and stops the pickup control circuit on the basis of an amount of data in the memory.

In the data reproduction apparatus according to the first aspect of the present invention, the DC signal generation circuit may output the DC signal to keep the disk rotating even when the writing of information to the memory is interrupted on the basis of an amount of data in the memory.

In the data reproduction apparatus according to the first aspect of the present invention, the apparatus may further comprise a rotation control circuit for generating a control signal for making a reproduction linear velocity of the disk substantially constant from a synchronization signal recorded on the disk and separated by the signal processing circuit, and a low-pass filter for extracting a DC component from an output signal of the rotation control circuit, and the DC signal generation circuit may hold an output signal of the low-pass filter.

In the data reproduction apparatus according to the first aspect of the present invention, the apparatus may further comprise a rotation control circuit for generating a control signal for making an angular velocity of the disk substantially constant based on an angular velocity information obtained from the disk motor, and a low-pass filter for extracting a DC component from an output signal of the rotation control circuit, and the DC signal generation circuit may hold an output signal of the low-pass filter.

In the data reproduction apparatus according to the first aspect of the present invention, the signal processing circuit may comprise a synchronization signal separation circuit for separating a synchronization signal from the output signal of the binarization circuit, a demodulation circuit for demodulating the reproduction information in an output signal of the synchronization signal separation circuit and for separating sub-code information from the output signal of the synchronization signal separation circuit, an error-correction circuit for error-correcting the demodulated reproduction information output from the demodulation circuit, and a sub-code processing circuit for demodulating the sub-code information separated at the demodulation circuit. The signal processing circuit may further comprise a compression circuit for compressing the error-corrected reproduction information output from the error-correction circuit, or a CD-ROM decoding circuit for decoding the error-corrected reproduction information output from the error-correction circuit.

In the data reproduction apparatus according to the first aspect of the present invention, the reproduction clock signal generation circuit may comprise a crystal oscillator.

According to a second aspect of the present invention, there is provided a data reproduction control circuit comprising a binarization circuit for converting a signal including information read out from a disk on which the information is recorded into binary data; a PLL circuit for generating a clock signal synchronized with an output signal of the binarization circuit; a signal processing circuit for processing the output signal of the binarization circuit based on the clock signal generated by the PLL circuit to output information; a reproduction clock signal generation circuit for generating a reproduction clock signal necessary for reproducing the information from the disk; a memory to which the information output from the signal processing circuit is written in response to the clock signal generated by the PLL circuit and from which information is read in response to the reproduction clock signal generated by the reproduction clock signal generation circuit, for storing the information read out from the disk; and a DC signal generation circuit for generating a DC signal to control the rotation of the disk. In the data reproduction apparatus according to the second aspect of the present invention, the disk motor can be rotated by a DC signal. Accordingly, acceleration and deceleration in the speed control of the disk motor are not executed to decrease the power consumption of the disk motor caused by the acceleration and deceleration of the disk motor. In particular, when the pickup element is moved suddenly in and out along a radius of the disk for access, unlike in the prior art case, the disk motor is not controlled at CLV by its acceleration and deceleration and thus power consumption of the motor system can be decreased. Furthermore, the above power consumption can be decreased even by the use of an inexpensive DC motor with a brush.

In the data reproduction apparatus according to the second aspect of the present invention, the data reproduction control circuit may further comprise a linear velocity detection circuit for detecting a reproduction linear velocity of the disk from a synchronization signal recorded on the disk and separated by the signal processing circuit.

In the data reproduction apparatus according to the second aspect of the present invention, the data reproduction control circuit may further comprise a rotation control circuit for generating a control signal for making a reproduction linear velocity of the disk substantially constant from a synchronization signal recorded on the disk and separated by the signal processing circuit, and a low-pass filter for extracting a DC component from an output signal of the rotation control circuit, and the DC signal generation circuit may hold an output signal of the low-pass filter.

In the data reproduction apparatus according to the second aspect of the present invention, the data reproduction control circuit may further comprise a rotation control circuit for generating a control signal for making an angular velocity of the disk substantially constant based on an angular velocity information obtained from the disk motor, and a low-pass filter for extracting a DC component from an output signal of the rotation control circuit, and the DC signal generation circuit may hold an output signal of the low-pass filter.

In the data reproduction apparatus according to the second aspect of the present invention, the signal processing circuit may comprise a synchronization signal separation circuit for separating the synchronization signal from the output signal of the binarization circuit, a demodulation circuit for demodulating the reproduction information in an output signal of the synchronization signal separation circuit and for separating sub-code information from the output signal of the synchronization signal separation circuit, an error-correction circuit for error-correcting the demodulated reproduction information output from the demodulation circuit, and a sub-code processing circuit for demodulating the sub-code information separated at the demodulation circuit. The signal processing circuit may further comprise a compression circuit for compressing the error-corrected reproduction information output from the error-correction circuit, or a CD-ROM decoding circuit for decoding the error-corrected reproduction information output from the error-correction circuit.

In the data reproduction apparatus according to the second aspect of the present invention, the reproduction clock signal generation circuit may comprise a crystal oscillator.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Hereinafter embodiments of the present invention will be described with reference to the accompanying drawings.

Figure 1:
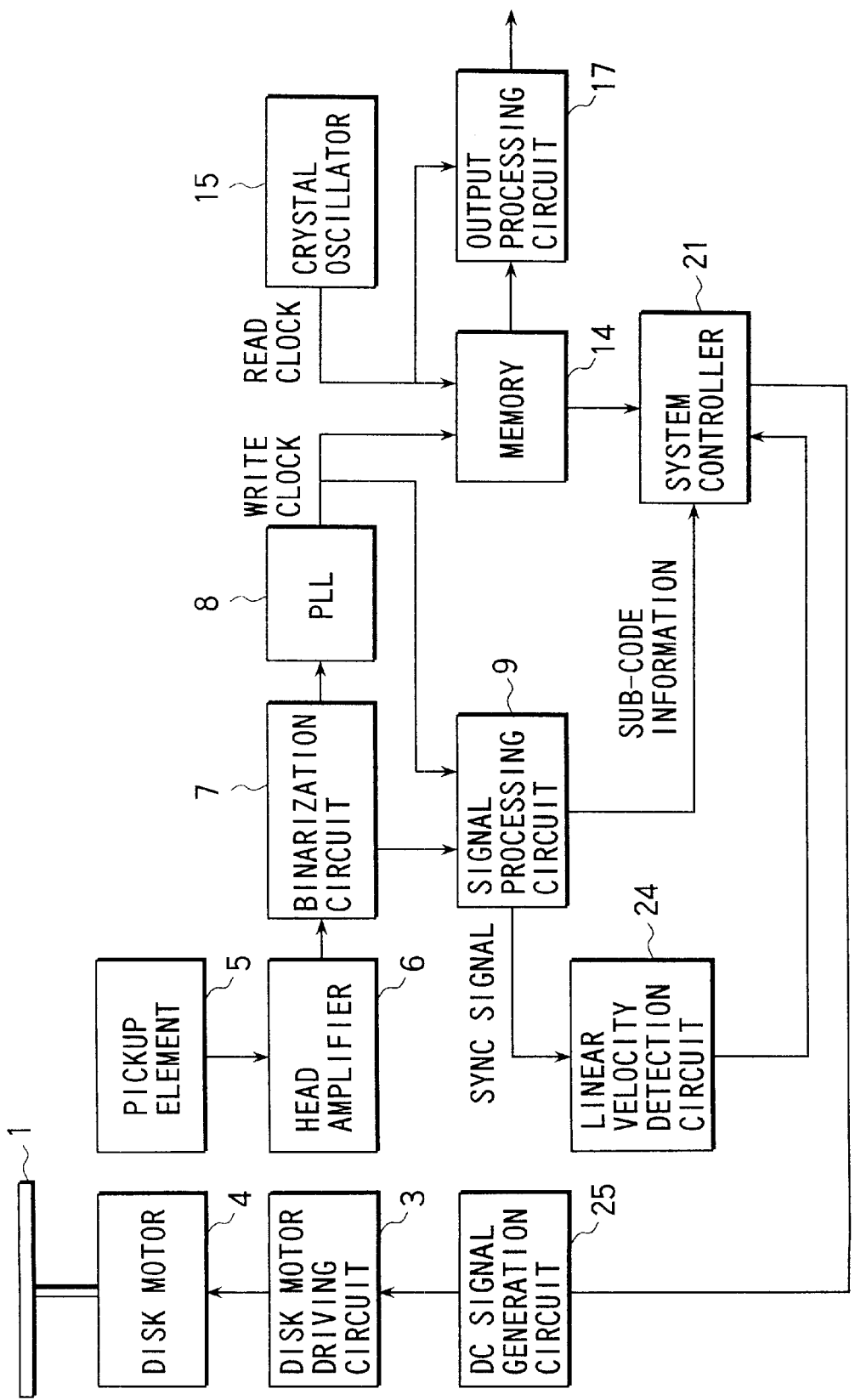
FIG. 1 is a block diagram of a data reproduction apparatus according to a first embodiment of the present invention.

The first embodiment will now be described with reference to FIGS. 1 to 3. FIG. 1 is a block diagram of a data reproduction apparatus according to a first embodiment of the present invention. As shown in FIG. 1, a disk 1 is rotated by a disk motor driving circuit 3 and a disk motor 4 in response to a given DC signal generated by a DC signal generation circuit 25. A pickup element 5 linearly tracks the rotating disk 1 from its inner radius to its outer radius to read data out of the disk 1. The data read by the pickup element 5 is amplified by a head amplifier 6 and converted to a wide-band signal (RF signal). The RF signal is then converted to binary data of only two high and low levels by a binarization circuit 7. The binary data is supplied to a PLL circuit 8 and a signal processing circuit 9. In the circuit 9, a synchronization signal separation circuit 10 (FIGS. 2 and 3) separates a synchronization signal from the RF signal and sends it to a linear velocity detection circuit 24. The reproduction data excluding the synchronization signal is demodulated by a demodulation circuit 11 and then error-corrected by an error-correction circuit 12. The error-corrected data is written to a memory 14 directly or through a compression circuit 13 (FIG. 2) or a CD-ROM decoding circuit 22 (FIG. 3) in response to a clock signal generated from the PLL circuit 8, which is synchronized with an RF signal.

The data written to the memory 14 is read out at a given reproduction velocity in response to a clock signal generated from a crystal oscillator 15 and then supplied to an output processing circuit 17. In the data reproduction apparatus shown in FIG. 2 including the compression circuit 13, the data written to the memory 14 is supplied through an expansion circuit 16 to an output processing circuit 17. The circuit 17 outputs the data in a desired output form. A system controller (microprocessor) 21 monitors an amount of data in the memory 14 and address information to control writing of data to the memory 14 so as to prevent the memory 14 from overflowing. The linear velocity detection circuit 24 detects a reproduction linear velocity of the disk 1 in response to a synchronization signal from the signal processing circuit 9 and then supplies the detected linear velocity to the system controller 21. Based on the detected linear velocity, the system controller 21 monitors the rotation speed of the disk motor 4 or the velocity at which data is written to the memory 14 to control the output of the DC signal generation circuit 25. The sub-code information separated in the demodulation circuit 11 is transmitted to a sub-code processing circuit 20 to demodulate the sub-code, for example, address information (FIGS. 2 and 3).

In the data reproduction apparatus and data reproduction control circuit having the above constitution, the disk 1 can be rotated at almost a desired velocity in response to a DC signal having a given value without any feedback control to store data read by the pickup element 5 in the semiconductor memory 14 and then read it therefrom at fixed reproduction velocity. If the motor is rotated only by the DC signal, its speed variations (wow and flutter) occur; however, they can be prevented completely if the capacity of the memory 14 is considerably large.

If the disk motor 4 is rotated completely by the DC signal, it can be decreased in power consumption since no speed control such as acceleration and deceleration is executed. In particular, when the pickup element 5 is moved in and out along a radius of the disk by an access, the disk motor 4 is not controlled at CLV by its acceleration and deceleration and thus the motor system can be decreased in power consumption.

If the disk motor is controlled at CAV, the above power consumption can be decreased. However, in order to rotate the disk on which data is recorded at CLV, such as a CD, at CAV, a means for detecting an angular velocity is needed. A motor with a hole sensor and a pulse encoder are therefore required, which will increase in manufacturing costs. In the foregoing reproduction apparatus or reproduction control circuit, the above power consumption can be decreased even by the use of an inexpensive DC motor with a brush.

Figure 2:
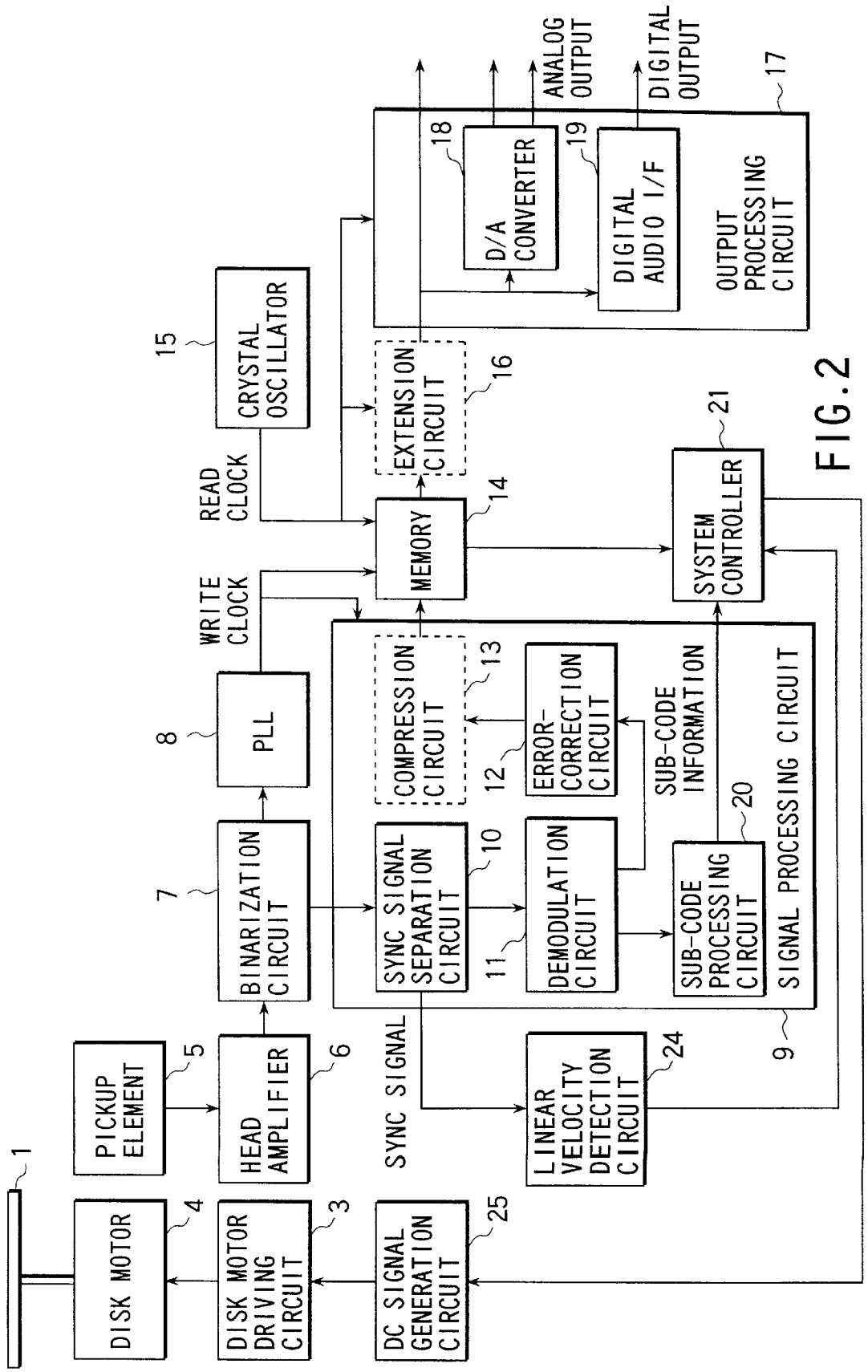
FIG. 2 is a block diagram of an audio data reproduction apparatus, such as a CD player and an MD player, according to the first embodiment of the present invention.
Figure 3:
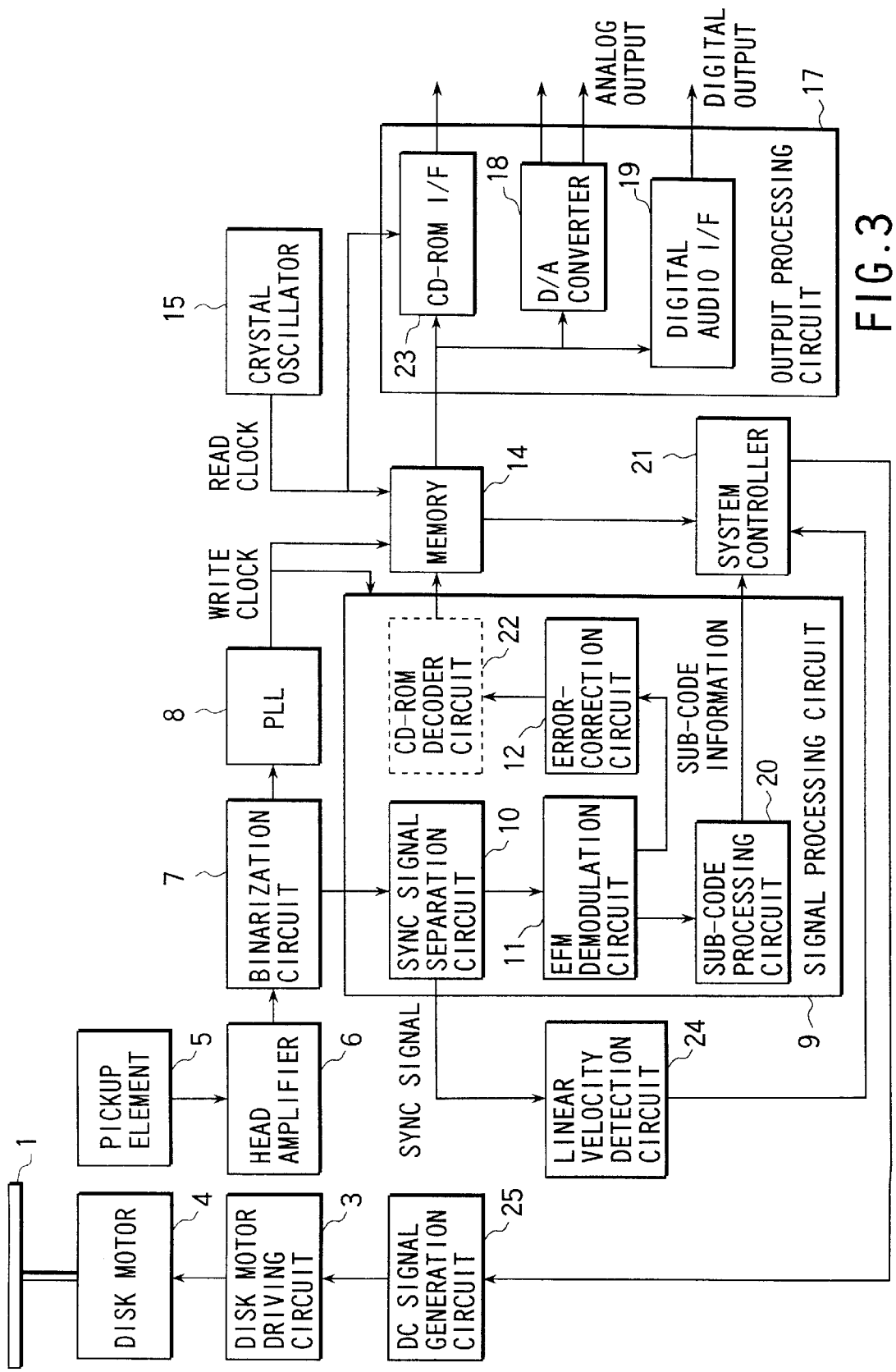
FIG. 3 is a block diagram of a data reproduction apparatus for information equipment such as a CD-ROM drive according to the first embodiment of the present invention.

FIG. 2 illustrates a system configuration of an audio player such as a CD player and an MD player as the above-described data reproduction apparatus. FIG. 3 depicts a configuration of a peripheral storage apparatus of information equipment such as a CD-ROM drive as the above data reproduction apparatus.

A second embodiment will now be described with reference to FIGS. 4 to 7.

Figure 4:
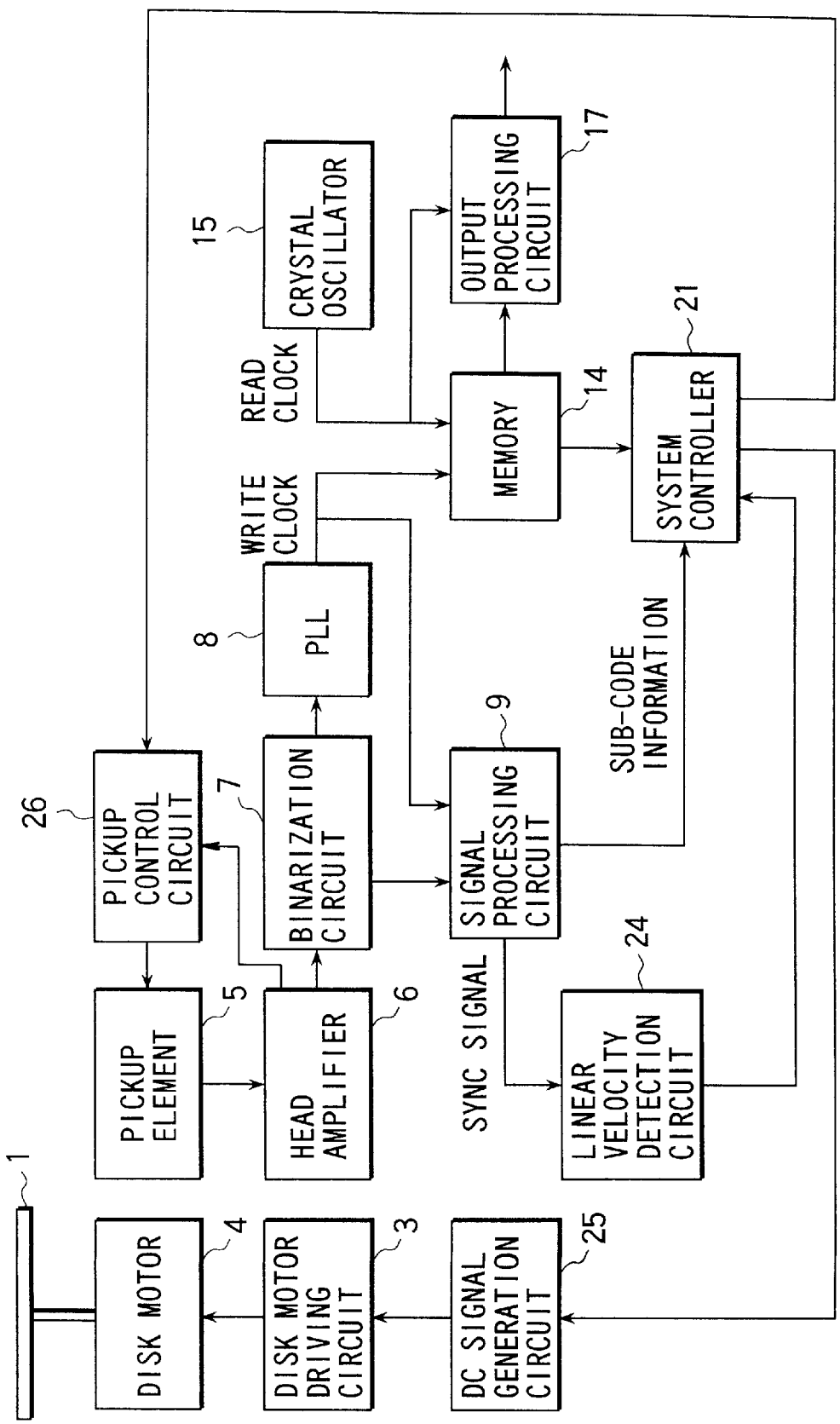
FIG. 4 is a block diagram of a data reproduction apparatus according to a second embodiment of the present invention.
Figure 5:
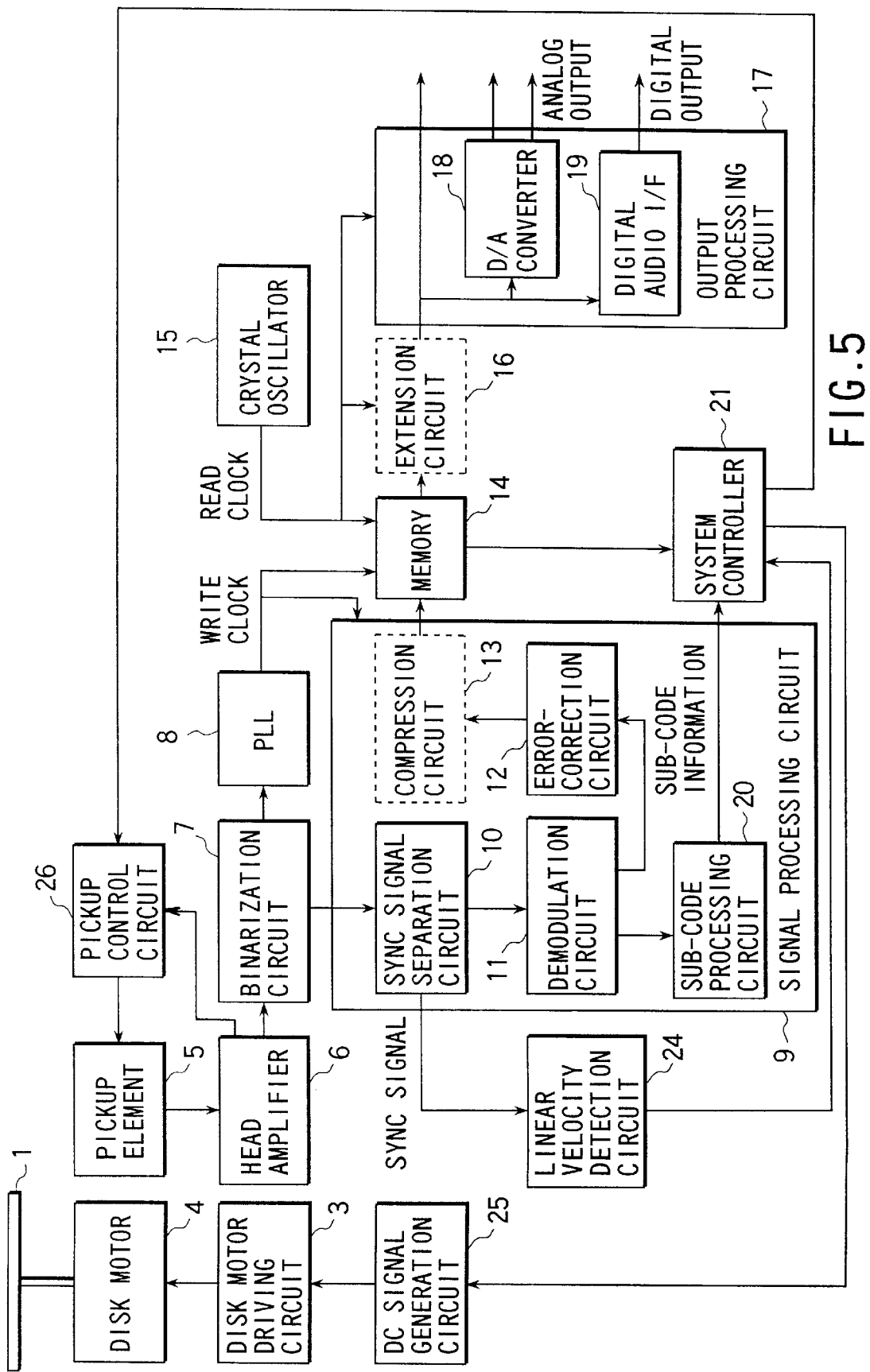
FIG. 5 is a block diagram of an audio data reproduction apparatus, such as a CD player and an MD player, according to the second embodiment of the present invention.
Figure 6:
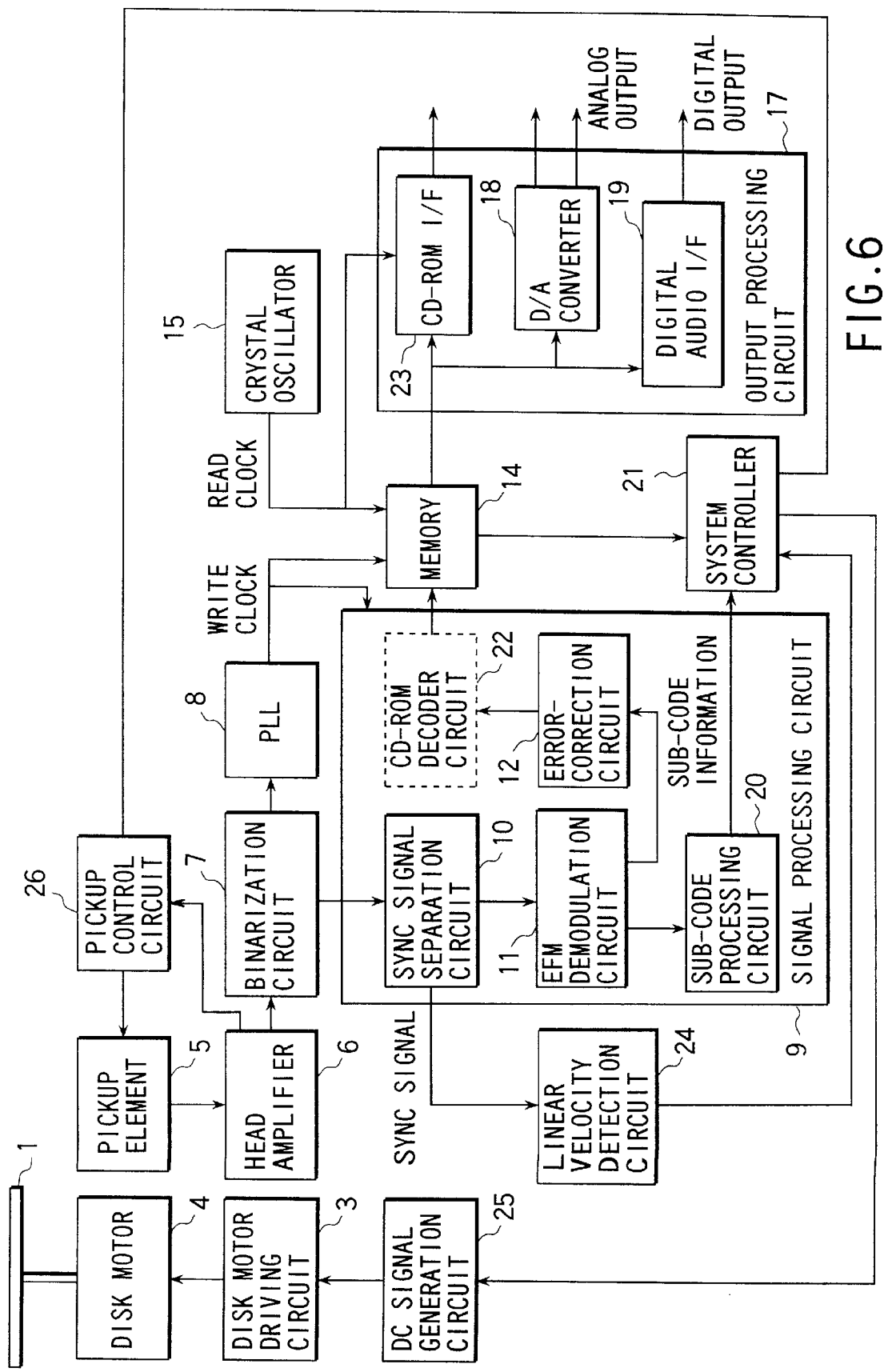
FIG. 6 is a block diagram of a data reproduction apparatus for information equipment such as a CD-ROM drive according to the second embodiment of the present invention.

FIG. 4 illustrates a data reproduction apparatus having an on-off function for pickup control. FIG. 5 illustrates a system configuration when the data reproduction apparatus shown in FIG. 4 is applied to an audio player such as a CD player and an MD player. FIG. 6 depicts a configuration of a peripheral storage apparatus of information equipment when the data reproduction apparatus shown in FIG. 4 is applied to a CD-ROM driver.

A pickup control circuit 26 controls a position of a pickup element 5 for data readout. A position control signal is generated by a head amplifier 6 and supplied to the pickup control circuit 26. The on-off states of the pickup control circuit 26 are controlled by a system controller 21. While no data is being written to a memory 14, the pickup control is stopped to suppress the power consumption of the pickup control circuit 26.

Figure 7:
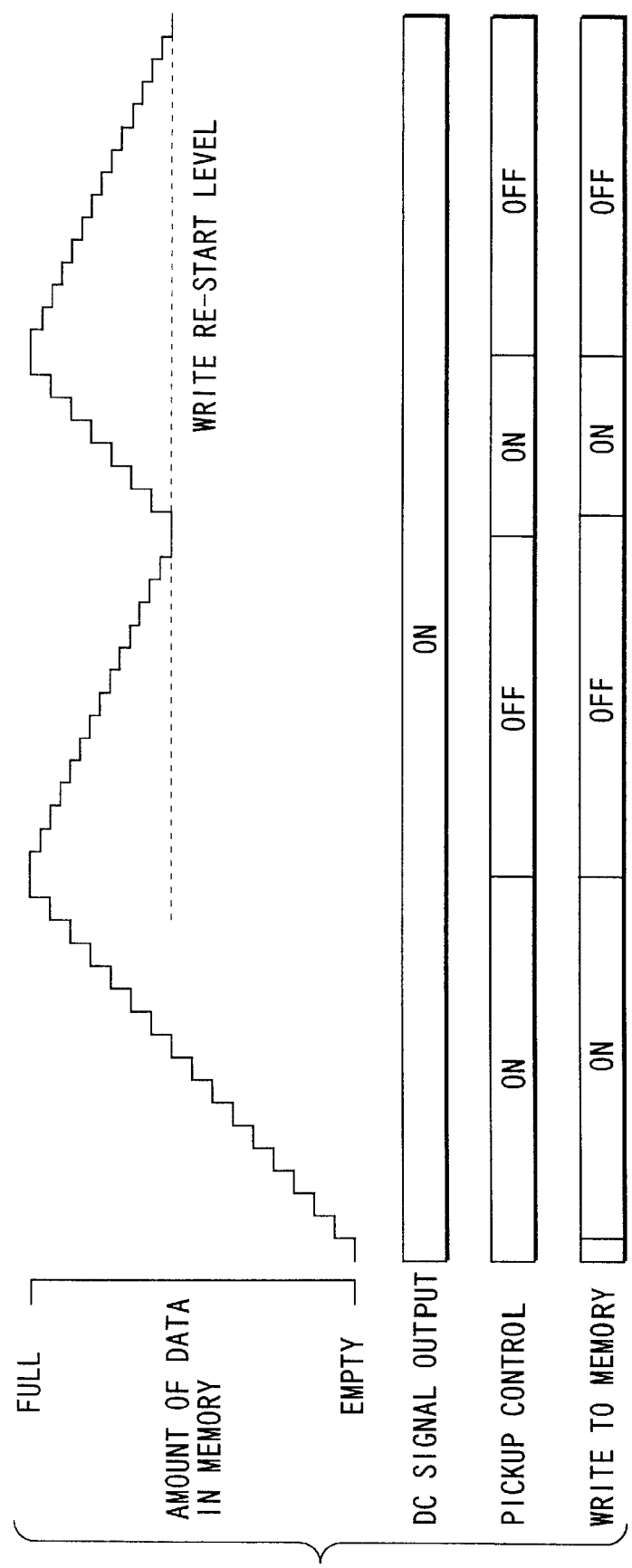
FIG. 7 is a timing chart of the data reproduction apparatus according to the second embodiment of the present invention.

FIG. 7 shows an amount of data of the memory 14, on-off states of the pickup control circuit 26, and an operation of the DC signal generation circuit 25.

If a playback of the disk is started when the memory 14 is empty, the pickup control circuit 26 and DC signal generation circuit 25 are both turned on. The data read by the pickup element 5 is amplified by the head amplifier 6 and converted to a binary signal by the binarization circuit 7. When the PLL circuit 8 synchronizes a clock signal with the binary signal, the signal processing circuit 9 processes the signal to start writing of data to the memory 14. Since the output of the DC signal generation circuit 25 is set in advance such that the write speed of data to the memory 14 is higher than the read speed of data therefrom, data is stored in the memory 14 at the same time when it is written thereto.

When the memory 14 is filled with data, the writing is stopped (intermitted) and simultaneously the pickup control circuit 26 is turned off and prevented from decreasing in power consumption. Even during the intermission of writing, a read operation is performed at given velocity and thus the amount of data in the memory 14 is reduced. When the data amount is decreased to a preset write resumption level, the pickup control circuit 26 is turned on again. When the PLL circuit 8 is synchronized, data restarts to be written to the memory 14. After that, the amount of data starts to increase.

During the above operation, the DC signal generation circuit 25 is kept turned-on and thus the disk motor 4 continues to rotate in response to a DC drive signal. Consequently, during the above operation, the disk motor 4 continues to rotate, regardless of whether the pickup control circuit 26 turns on or off.

The data reproduction apparatus of the second embodiment has the advantage that the pickup control system can be decreased in power consumption by turning off the pickup control circuit 26 while data is not being written to the memory 14, in addition to the advantage of the apparatus of the first embodiment.

Since, moreover, the disk motor 4 continues to rotate in response to the same DC drive signal during the off state of the pickup control circuit 26, its rotation is not unstable (transition from off-state to on-state) when the circuit 26 turns on again to resume the writing of data to the memory 14; therefore, the resumption of writing can be quickened. In the prior art case, the CLV control is not stabilized until the pickup control circuit 26 is turned on and the PLL circuit 8 is synchronized to obtain a synchronization signal and thus a time is required to restart the writing of data. Since, in the second embodiment of the present invention, the time can be shortened, a time period during which the pickup control circuit 26 turns on can be made shorter than that in the prior art case and accordingly the pickup control system can be decreased in power consumption.

FIG. 5 illustrates a configuration system of an audio player such as a CD player and an MD player as the data reproduction apparatus of the second embodiment. FIG. 6 depicts a configuration of a peripheral storage apparatus for information equipment such as a CD-ROM drive as the data reproduction apparatus of the second embodiment.

A third embodiment will now be described with reference to FIGS. 8 to 10.

Figure 8:
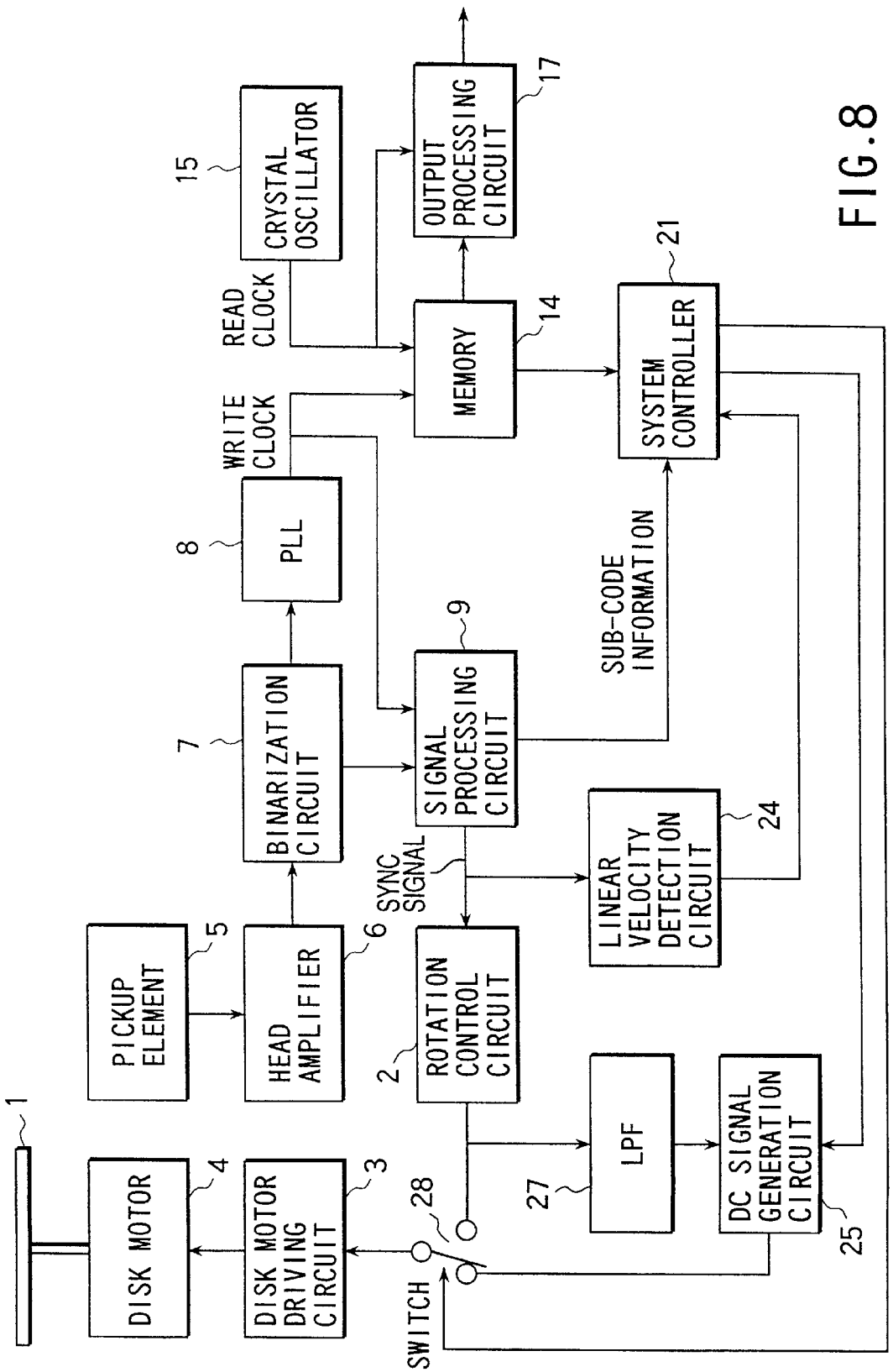
FIG. 8 is a block diagram of a data reproduction apparatus according to a third embodiment of the present invention.

FIG. 8 is a block diagram of a data reproduction apparatus having a data reproduction control circuit according to the third embodiment of the present invention. FIG. 9 illustrates a system configuration when the data reproduction apparatus shown in FIG. 8 is applied to an audio player such as a CD player and an MD player. FIG. 10 depicts a configuration of a peripheral storage apparatus of information equipment when the data reproduction apparatus shown in FIG. 8 is applied to a CD-ROM driver.

As illustrated in FIG. 8, a disk 1 is rotated by a disk motor driving circuit 3 and a disk motor 4. A pickup element 5 linearly tracks the rotating disk 1 from its inner radius to its outer radius to read data out of the disk 1. The data read by the pickup element 5 is amplified by a head amplifier 6 and converted to a wide-band signal (RF signal). The RF signal is then converted to a binary signal of high and low levels by a binarization circuit 7. The binary signal is supplied to a PLL circuit 8 and a signal processing circuit 9. The circuit 9 separates a synchronization signal from the binary signal and sends it to a rotation control circuit 2. The reproduction data excluding the synchronization signal is demodulated and error-corrected, as in the first and second embodiments shown in FIGS. 2 and 3. The error-corrected data is written to a memory 14 in response to a clock signal generated from the PLL circuit 8, which is synchronized with an RF signal. The data written to the memory 14 is read out at a given reproduction velocity in response to a clock signal generated from a crystal oscillator 15 and then supplied to an output processing circuit 17.

The circuit 17 outputs the data in a desired output form. A system controller (microprocessor) 21 monitors an amount of data in the memory 14 and address information to control writing of data to the memory 14 so as to prevent the memory 14 from overflowing. A rotation control circuit 2 generates a signal for rotating the disk 1 at CLV by a synchronization signal supplied from the signal processing circuit 9. First the system controller 21 sets a switch 28 to the rotation control circuit 2 to rotate the disk 1 at CLV and during that time an LPF (low-pass filter) 27 extracts a DC component of an output signal of the rotation control circuit 2. A DC signal generation circuit 25 holds a DC signal output from the LPF 27. After that, the system controller 21 sets the switch 28 to the DC signal generation circuit 25 to drive the disk motor 4 by a DC signal.

In the third embodiment, first, the disk motor 4 is rotated at CLV and the DC component of an output signal of the rotation control circuit 2 is held. Therefore, the rotation speed after the switch 28 is changed to the DC signal generation circuit 25, is equivalent to that controlled by the signal output from the rotation control circuit 2. The rotation speed of the disk 1 can thus be prevented from varying due to variations in torque of the disk motor 4, variations in electrical characteristics of the disk motor driving circuit 3, and changes in environment such as ambient temperature. For example, when data is read out of the innermost radius of the disk, if the disk is rotated at a specific CLV (e.g., bit rate: 17.2872 Mbps) and a DC component of an output signal of the rotation control circuit 2 is held, the disk continues to rotate at CAV which is close to CAV (17.2872 Mbps in the innermost radius of the disk).

In the third embodiment, if there are variations in torque of the disk motor caused when a reproduction apparatus is mass-produced or variations in mass of disks, the variations can be reduced, and the disk can be rotated at a rotation speed with small variations in response to a DC signal, which is one feature of the present invention.

Figure 9:
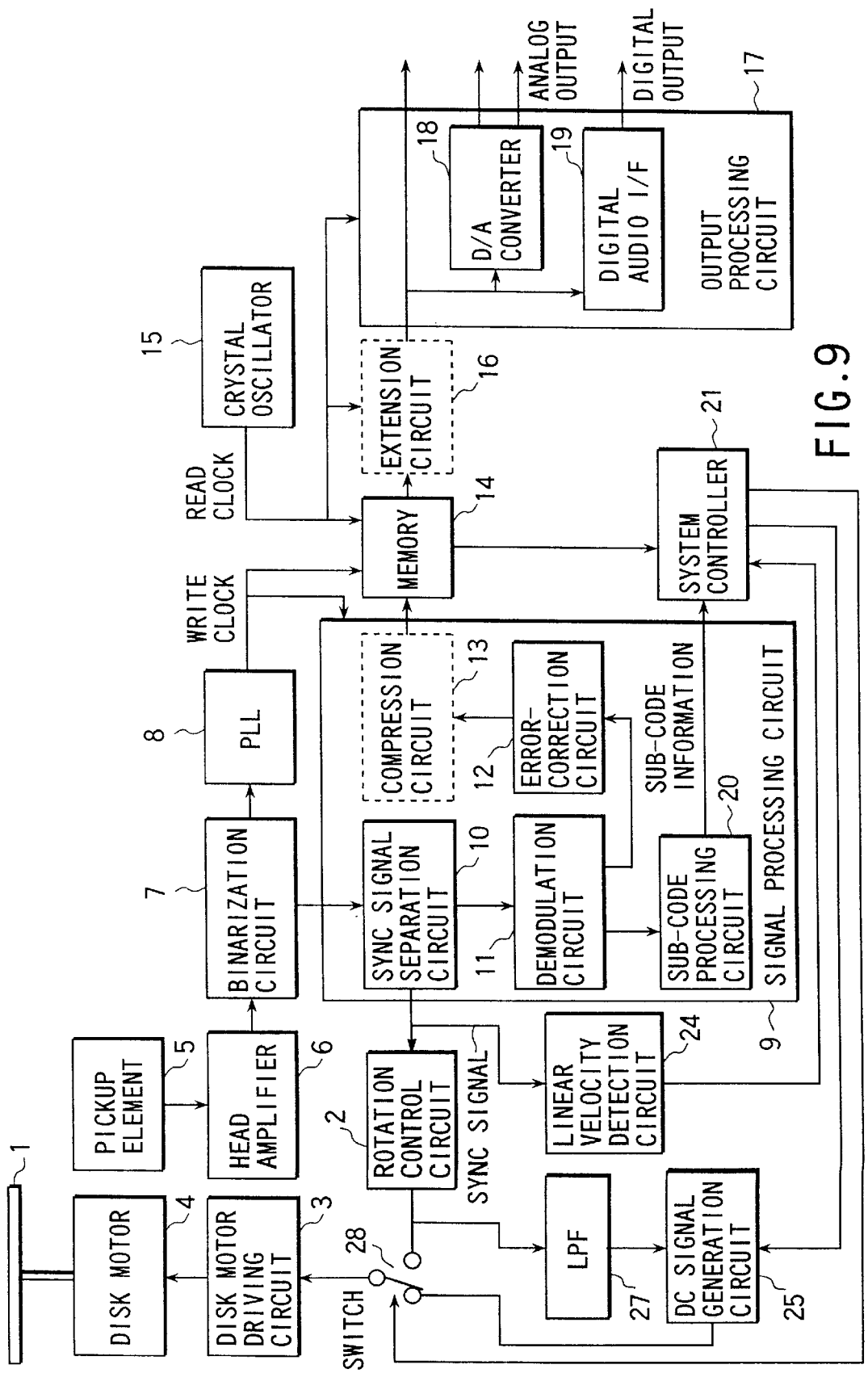
FIG. 9 is a block diagram of an audio data reproduction apparatus, such as a CD player and an MD player, according to the third embodiment of the present invention.
Figure 10:
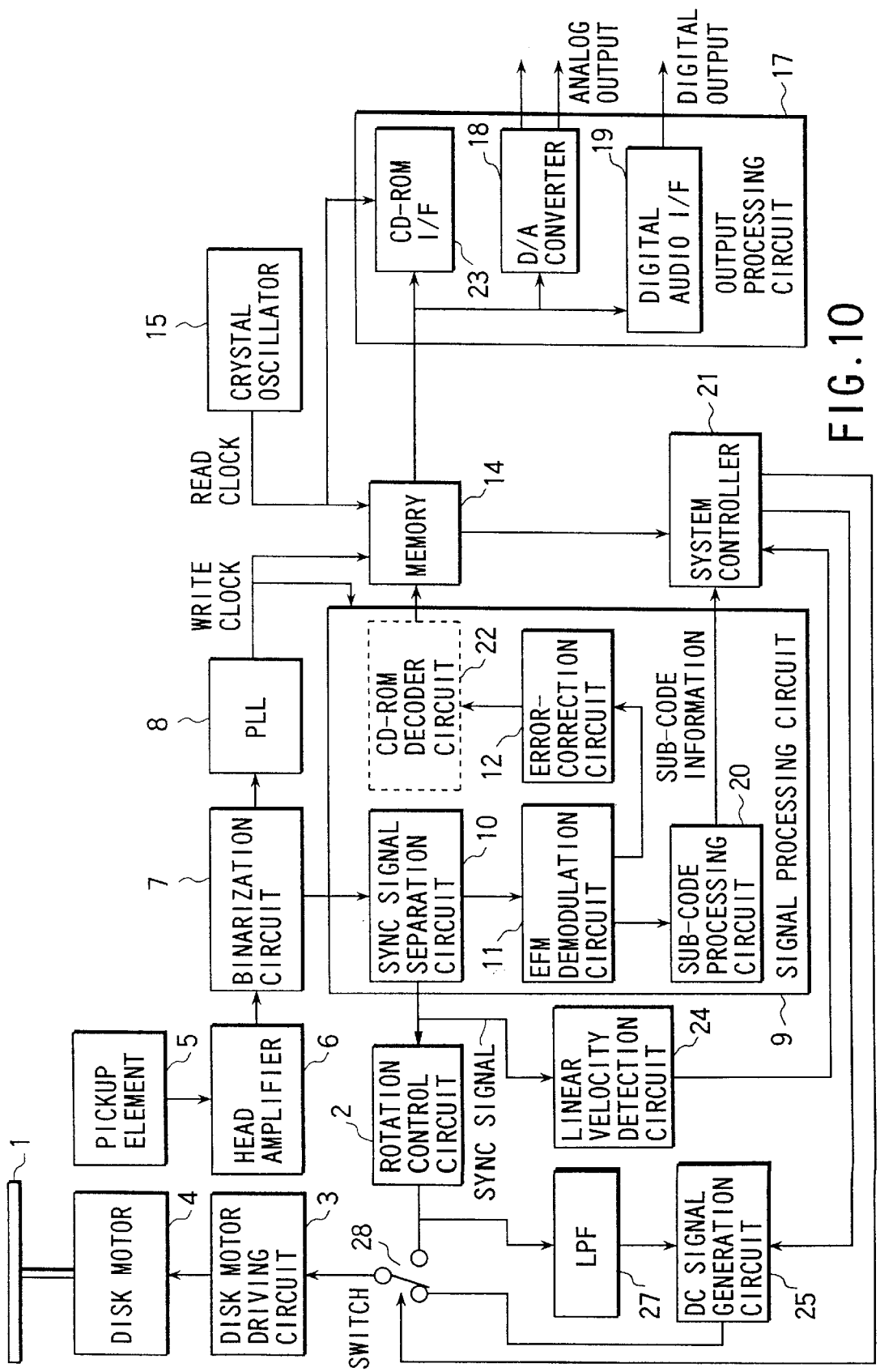
FIG. 10 is a block diagram of a data reproduction apparatus for information equipment such as a CD-ROM drive according to the third embodiment of the present invention.

FIG. 9 illustrates a system configuration of an audio player such as a CD player and an MD player as the data reproduction apparatus of the third embodiment. FIG. 10 shows a configuration of a peripheral storage apparatus for information equipment such as a CD-ROM drive as the data reproduction apparatus of the third embodiment.

A fourth embodiment will now be described with reference to FIG. 11.

Figure 11:
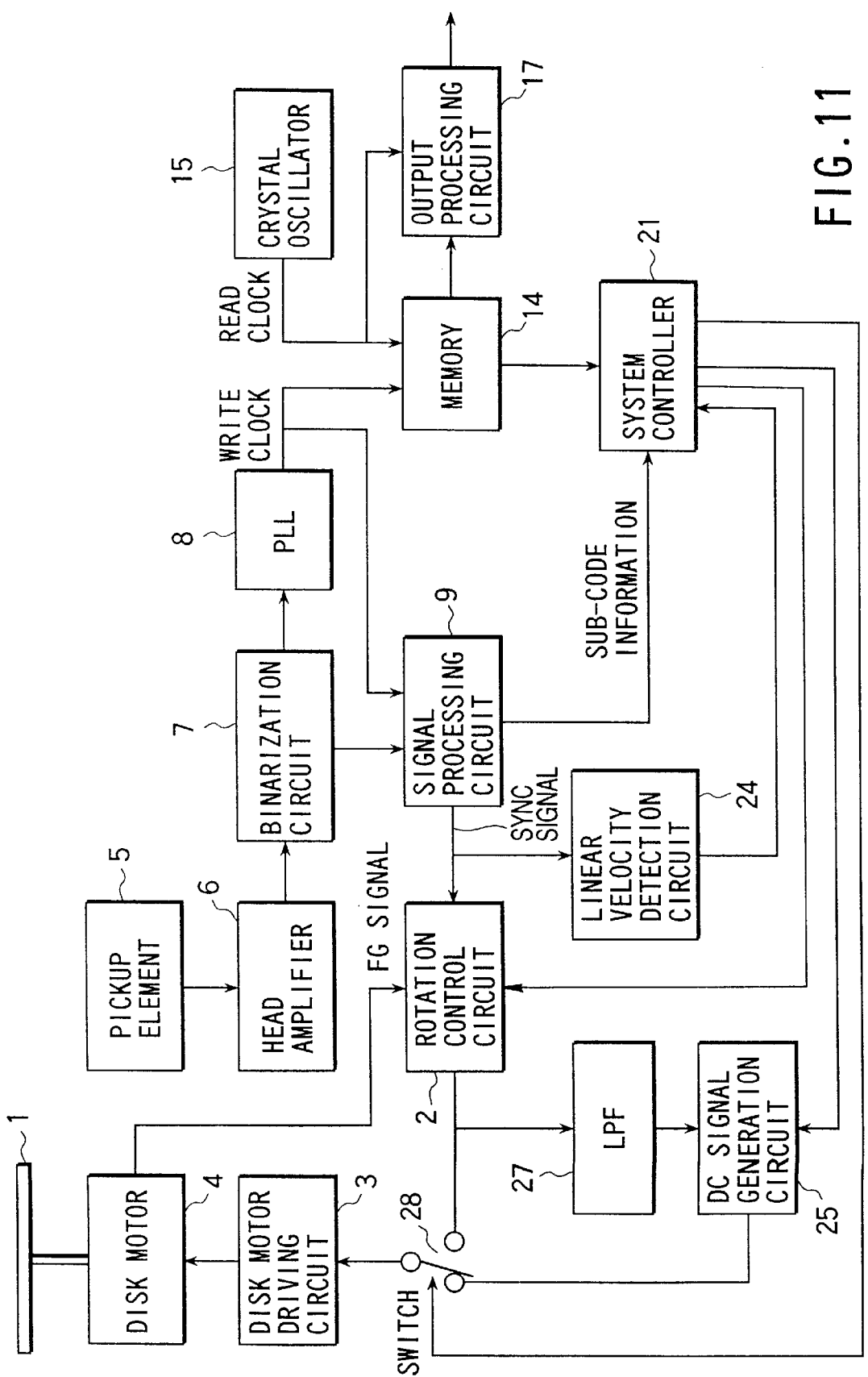
FIG. 11 is a block diagram of a data reproduction apparatus according to a fourth embodiment of the present invention.

FIG. 11 is a block diagram of a data reproduction apparatus having a data reproduction control circuit according to the fourth embodiment of the present invention. As shown in FIG. 11, a disk 1 is rotated by a disk motor driving circuit 3 and a disk motor 4. A pickup element 5 linearly tracks the rotating disk 1 from its inner radius to its outer radius to read data out of the disk 1. The data read by the pickup element 5 is amplified by a head amplifier 6 and converted to a wide-band signal (RF signal). The RF signal is then converted to a binary signal of high and low levels by a binarization circuit 7. The binary signal is supplied to a PLL circuit 8 and a signal processing circuit 9. The circuit 9 separates a synchronization signal from the binary signal and sends it to a rotation control circuit 2. The reproduction data excluding the synchronization signal is demodulated and error-corrected, as in the first and second embodiments shown in FIGS. 2 and 3. The error-corrected data is written to a memory 14 in response to a clock signal generated from the PLL circuit 8, which is synchronized with an RF signal. The data written to the memory 14 is read out at a given reproduction velocity in response to a clock signal generated from a crystal oscillator 15 and then supplied to an output processing circuit 17.

The circuit 17 outputs the data in a desired output form. A system controller (microprocessor) 21 monitors an amount of data in the memory 14 and address information to control writing of data to the memory 14 so as to prevent the memory 14 from overflowing. A rotation control circuit 2 generates a signal for rotating the disk 1 at CLV in response to a synchronization signal supplied from the signal processing circuit 9, or a signal for rotating the disk 1 at CAV in response to an FG signal supplied from the disk motor 4. The rotation control circuit 2 comprises a switch circuit (not shown), and by the switch operation of the switch circuit, the rotation control circuit 2 generates the signal for rotating the disk 1 at CLV in response to the synchronization signal supplied from the signal processing circuit 9, or the signal for rotating the disk 1 at CAV in response to the FG signal supplied from the disk motor 4. The operation of the switch circuit of the rotation control circuit 2 is controlled by a control signal from the system controller. First the system controller 21 sets a switch 28 to the rotation control circuit 2 to rotate the disk 1 at CLV or CAV and during that time an LPF (low-pass filter) 27 extracts a DC component of an output signal of the rotation control circuit 2. A DC signal generation circuit 25 holds a DC signal output from the LPF 27. After that, the system controller 21 sets the switch 28 to the DC signal generation circuit 25 to drive the disk motor 4 by a DC signal.

The FG signal is an output signal of a detector (not shown) for detecting a rotation speed of the disk motor 4 and is a factor necessary for rotating the disk at CAV. The rotation speed signal (FG signal) of the disk motor 4 detected by the detector is supplied to the rotation control circuit 2.

In the fourth embodiment, first, the disk motor 4 is rotated at CLV using the synchronization signal or CAV using the FG signal, and the DC component of an output signal of the rotation control circuit 2 is held. Therefore, the rotation speed after the switch 28 is changed to the DC signal generation circuit 25, is equivalent to that controlled by the signal output from the rotation control circuit 2. The rotation speed of the disk 1 can thus be prevented from varying due to variations in torque of the disk motor 4, variations in electrical characteristics of the disk motor driving circuit 3, and changes in environment such as ambient temperature. For example, when data is read out of the innermost radius of the disk, if the disk is rotated at a specific CLV (e.g., bit rate: 17.2872 Mbps) and a DC component of an output signal of the rotation control circuit 2 is held, the disk continues to rotate at CAV which is close to CAV (17.2872 Mbps in the innermost radius of the disk).

In the fourth embodiment, if there are variations in torque of the disk motor caused when a reproduction apparatus is mass-produced or variations in mass of disks to be played back, the variations can be reduced, and the disk can be rotated at a rotation speed with small variations in response to a DC signal, which is one feature of the present invention.

A fifth embodiment will now be described with reference to FIG. 12.

Figure 12:
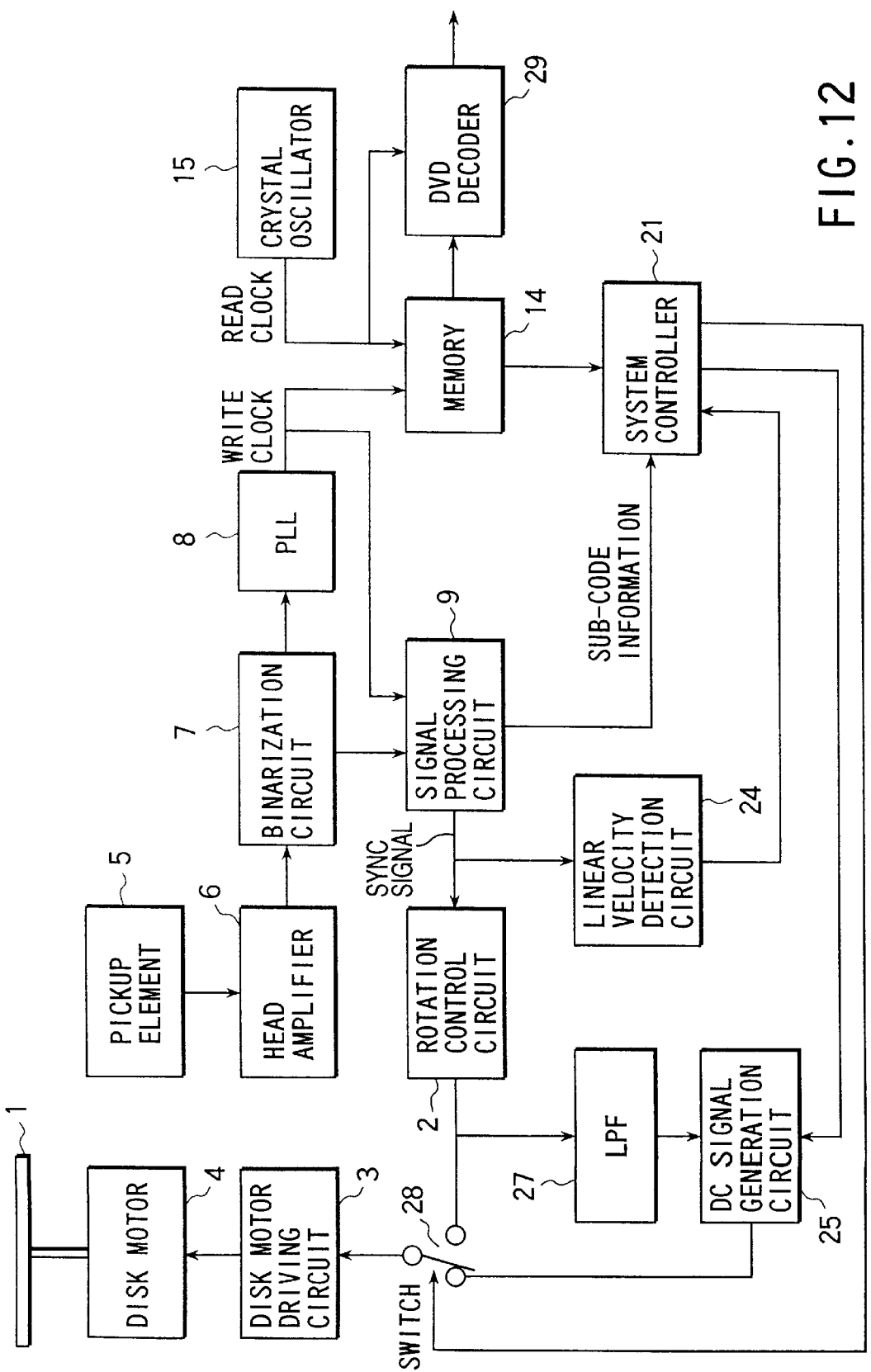
FIG. 12 is a block diagram of a data reproduction apparatus such as a DVD drive according to a fifth embodiment of the present invention.
Figure 13:
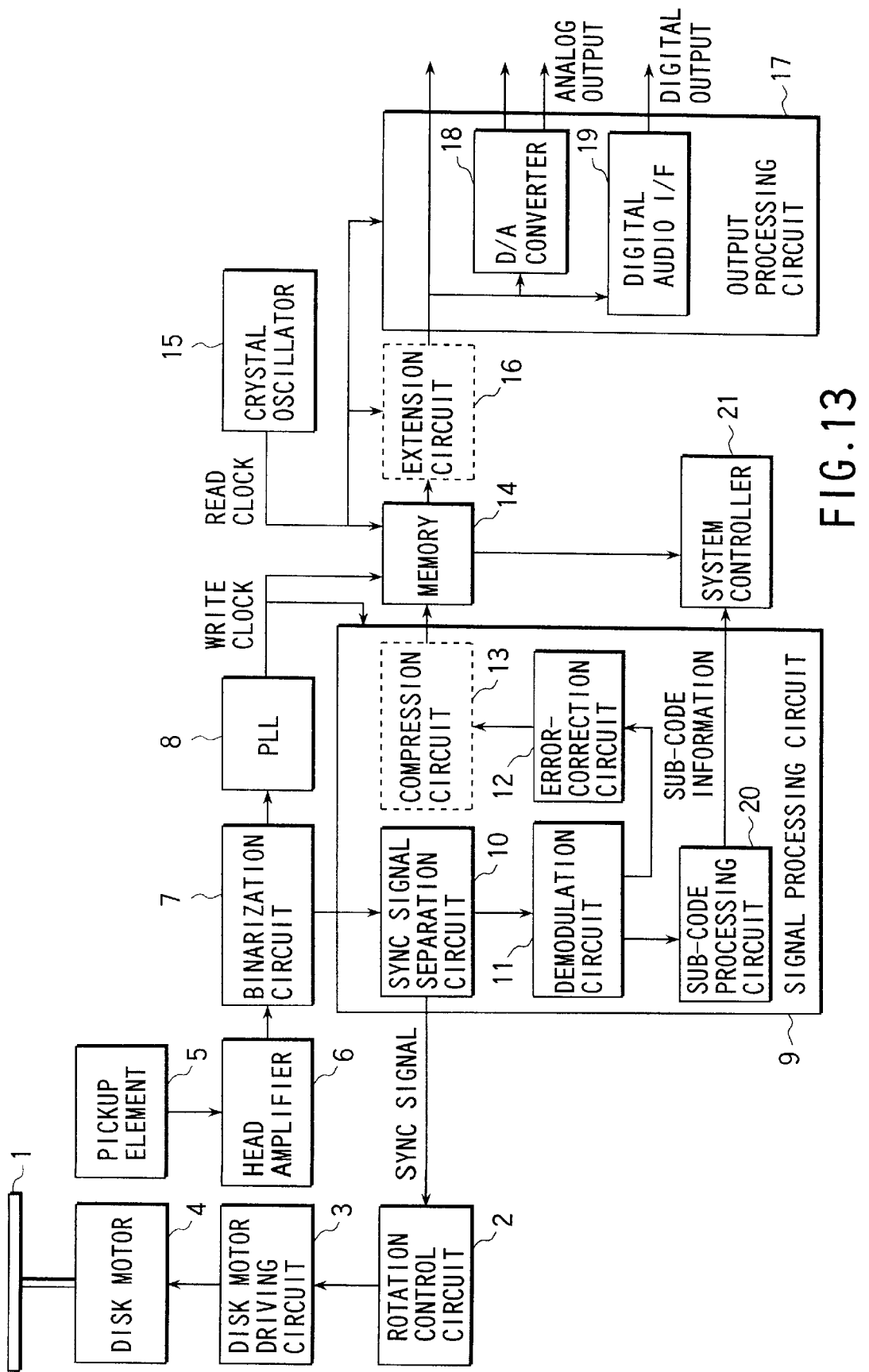
FIG. 13 is a block diagram of a prior art audio data reproduction apparatus such as a CD player and an MD player.
Figure 14:
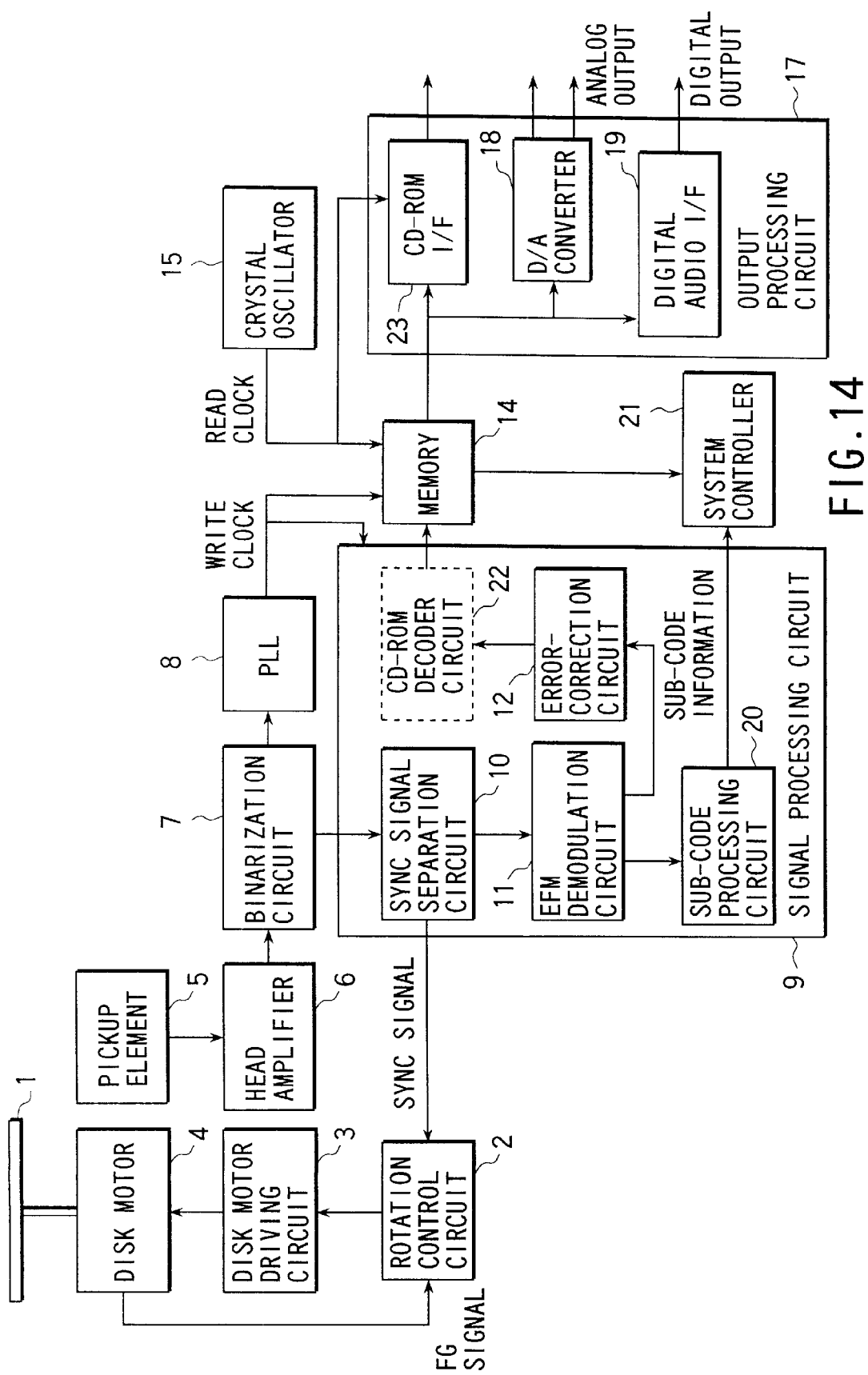
FIG. 14 is a block diagram of a prior art data reproduction apparatus for information equipment.

FIG. 12 is a block diagram of a DVD drive having a data reproduction control circuit. As shown in FIG. 11, a disk 1 is rotated by a disk motor driving circuit 3 and a disk motor 4. A pickup element 5 linearly tracks the rotating disk 1 from its inner radius to its outer radius to read data out of the disk 1. The data read by the pickup element 5 is amplified by a head amplifier 6 and converted to a wide-band signal (RF signal). The RF signal is then converted to a binary signal of high and low levels by a binarization circuit 7. The binary signal is supplied to a PLL circuit 8 and a signal processing circuit 9. The circuit 9 separates a synchronization signal from the binary signal and sends it to a rotation control circuit 2. The reproduction data excluding the synchronization signal is demodulated and error-corrected, and the error-corrected data is written to a memory 14 in response to a clock signal generated from the PLL circuit 8, which is synchronized with an RF signal. The data written to the memory 14 is read out at a given reproduction velocity in response to a clock signal generated from a crystal oscillator 15 and then supplied to a DVD decoder 29. The DVD decoder 29 outputs it in a desired output form.

The system controller (microprocessor) 21 monitors an amount of data in the memory 14 and address information to control writing of data to the memory 14 so as to prevent the memory 14 from overflowing. A rotation control circuit 2 generates a signal for rotating the disk 1 at CLV in response to a synchronization signal supplied from the signal processing circuit 9. First the system controller 21 sets a switch 28 to the rotation control circuit 2 to rotate the disk 1 at CLV and during that time an LPF (low-pass filter) 27 extracts a DC component of an output signal of the rotation control circuit 2. A DC signal generation circuit 25 holds a DC signal output from the LPF 27. After that, the system controller 21 sets the switch 28 to the DC signal generation circuit 25 to drive the disk motor 4 by a DC signal.

In the fifth embodiment, first, the disk motor 4 is rotated at CLV, and the DC component of an output signal of the rotation control circuit 2 is held. Therefore, the rotation speed after the switch 28 is changed to the DC signal generation circuit 25, is equivalent to that controlled by the signal output from the rotation control circuit 2. The rotation speed of the disk 1 can thus be prevented from varying due to variations in torque of the disk motor 4, variations in electrical characteristics of the disk motor driving circuit 3, and changes in environment such as ambient temperature. For example, when data is read out of the innermost radius of the disk, if the disk is rotated at a specific CLV (e.g., bit rate: 17.2872 Mbps) and a DC component of an output signal of the rotation control circuit 2 is held, the disk continues to rotate at CAV which is close to CAV (17.2872 Mbps in the innermost radius of the disk).

In the fifth embodiment, if there are variations in torque of the disk motor caused when a reproduction apparatus is mass-produced or variations in mass of disks, the disk can be rotated at a rotation speed with small variations in response to a DC signal, which is one feature of the present invention.

According to the present invention having the above configuration, the motor can be rotated by a DC signal to decrease in power consumption which caused by acceleration and deceleration. In particular, when a pickup element is moved suddenly in and out along a radius of the disk for access, unlike in the prior art case, the disk motor need not be rotated at CLV by its abrupt acceleration or deceleration and thus the motor system can be decreased in power consumption. The above power consumption can also be decreased by using a relatively inexpensive DC motor with a brush.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data reproduction apparatus comprising:
   a pickup element for reading out a signal including information from a disk on which the information is recorded;
   a head amplifier for amplifying necessary information output from the pickup element;
   a binarization circuit for converting a signal including the information amplified by the head amplifier into binary data;
   a PLL circuit for generating a clock signal synchronized with an output signal of the binarization circuit;
   a signal processing circuit for processing the output signal of the binarization circuit based on the clock signal generated by the PLL circuit to output information;
   a reproduction clock signal generation circuit for generating a reproduction clock signal necessary for reproducing the information from the disk;
   a memory to which the information output from the signal processing circuit is written in response to the clock signal generated by the PLL circuit and from which information is read in response to the reproduction clock signal generated by the reproduction clock signal generation circuit, for storing the information read out from the disk;
   a disk motor for rotating the disk;
   a disk motor driving circuit for driving the disk motor; and
   a DC signal generation circuit for generating a DC signal and sending the DC signal to the disk motor driving circuit as a drive signal.

2. A data reproduction apparatus according to claim 1, wherein the apparatus further comprises a linear velocity detection circuit for detecting a reproduction linear velocity of the disk from a synchronization signal recorded on the disk and separated by the signal processing circuit.

3. A data reproduction apparatus according to claim 2, wherein the apparatus further comprises a system control circuit for monitoring the reproduction linear velocity detected by the linear velocity detection circuit, and controlling the DC signal output from the DC signal generation circuit on the basis of the result of the monitoring.

4. A data reproduction apparatus according to claim 1, wherein the apparatus further comprises a pickup control circuit for controlling the pickup element.

5. A data reproduction apparatus according to claim 4, wherein the apparatus further comprises a system control circuit which interrupts the writing of information to the memory and stops the pickup control circuit on the basis of an amount of data in the memory.

6. A data reproduction apparatus according to claim 1, wherein the DC signal generation circuit outputs the DC signal to keep the disk rotating even when the writing of information to the memory is interrupted on the basis of an amount of data in the memory.

7. A data reproduction apparatus according to claim 1, wherein the apparatus further comprises:
   a rotation control circuit for generating a control signal for making a reproduction linear velocity of the disk substantially constant from a synchronization signal recorded on the disk and separated by the signal processing circuit; and a low-pass filter for extracting a DC component from an output signal of the rotation control circuit, and wherein the DC signal generation circuit holds an output signal of the low-pass filter.

8. A data reproduction apparatus according to claim 1, wherein the apparatus further comprises:

a rotation control circuit for generating a control signal for making an angular velocity of the disk substantially constant based on an angular velocity information obtained from the disk motor; and a low-pass filter for extracting a DC component from an output signal of the rotation control circuit, and wherein the DC signal generation circuit holds an output signal of the low-pass filter.

9. A data reproduction apparatus according to claim 1, wherein the signal processing circuit comprises a synchronization signal separation circuit for separating a synchronization signal from the output signal of the binarization circuit, a demodulation circuit for demodulating the reproduction information in an output signal of the synchronization signal separation circuit and for separating sub-code information from the output signal of the synchronization signal separation circuit, an error-correction circuit for error-correcting the demodulated reproduction information output from the demodulation circuit, and a sub-code processing circuit for demodulating the sub-code information separated at the demodulation circuit.

10. A data reproduction apparatus according to claim 9, wherein the signal processing circuit further comprises a compression circuit for compressing the error-corrected reproduction information output from the error-correction circuit.

11. A data reproduction apparatus according to claim 9, wherein the signal processing circuit further comprises a CD-ROM decoding circuit for decoding the error-corrected reproduction information output from the error-correction circuit.

12. A data reproduction apparatus according to claim 1, wherein the reproduction clock signal generation circuit comprises a crystal oscillator.

13. A data reproduction control circuit comprising:

a binarization circuit for converting a signal including information read out from a disk on which the information is recorded into binary data;

a PLL circuit for generating a clock signal synchronized with an output signal of the binarization circuit;

a signal processing circuit for processing the output signal of the binarization circuit based on the clock signal generated by the PLL circuit to output information;

a reproduction clock signal generation circuit for generating a reproduction clock signal necessary for reproducing the information from the disk;

a memory to which the information output from the signal processing circuit is written in response to the clock signal generated by the PLL circuit and from which information is read in response to the reproduction clock signal generated by the reproduction clock signal generation circuit, for storing the information read out from the disk; and a DC signal generation circuit for generating a DC signal to control the rotation of the disk.

14. A data reproduction control circuit according to claim 13, wherein the data reproduction control circuit further comprises a linear velocity detection circuit for detecting a reproduction linear velocity of the disk from a synchronization signal recorded on the disk and separated by the signal processing circuit.

15. A data reproduction control circuit according to claim 13, wherein the data reproduction control circuit further comprises:

a rotation control circuit for generating a control signal for making a reproduction linear velocity of the disk substantially constant from a synchronization signal recorded on the disk and separated by the signal processing circuit; and a low-pass filter for extracting a DC component from an output signal of the rotation control circuit, and wherein the DC signal generation circuit holds an output signal of the low-pass filter.

16. A data reproduction control circuit according to claim 13, wherein the data reproduction control circuit further comprises:

a rotation control circuit for generating a control signal for making an angular velocity of the disk substantially constant based on an angular velocity information obtained from the disk motor; and a low-pass filter for extracting a DC component from an output signal of the rotation control circuit, and wherein the DC signal generation circuit holds an output signal of the low-pass filter.

17. A data reproduction control circuit according to claim 13, wherein the signal processing circuit comprises a synchronization signal separation circuit for separating the synchronization signal from the output signal of the binarization circuit, a demodulation circuit for demodulating the reproduction information in an output signal of the synchronization signal separation circuit and for separating sub-code information from the output signal of the synchronization signal separation circuit, an error-correction circuit for error-correcting the demodulated reproduction information output from the demodulation circuit, and a sub-code processing circuit for demodulating the sub-code information separated at the demodulation circuit.

18. A data reproduction control circuit according to claim 17, wherein the signal processing circuit further comprises a compression circuit for compressing the error-corrected reproduction information output from the error-correction circuit.

19. A data reproduction control circuit according to claim 17, wherein the signal processing circuit further comprises a CD-ROM decoding circuit for decoding the error-corrected reproduction information output from the error-correction circuit.

20. A data reproduction control circuit according to claim 13, wherein the reproduction clock signal generation circuit comprises a crystal oscillator.

* * * * *